United States Patent [19]
Giedd et al.

[11] Patent Number: 5,505,093
[45] Date of Patent: Apr. 9, 1996

[54] HOMOGENEOUSLY CONDUCTIVE POLYMER FILMS AS STRAIN GAUGES

[75] Inventors: Ryan E. Giedd; Yongqiang Wang, both of Springfield; Mary G. Moss, Rolla; James Kaufmann, Newburg; Terry L. Brewer, Rolla, all of Mo.

[73] Assignee: Brewer Science, Inc., Rolla, Mo.

[21] Appl. No.: 342,906

[22] Filed: Nov. 21, 1994

[51] Int. Cl.$^6$ ........................................... G01L 1/18
[52] U.S. Cl. ................................... 73/774; 73/775
[58] Field of Search .................. 73/767, 768, 774, 73/775, 776; 338/2

[56] References Cited

U.S. PATENT DOCUMENTS

| | | | |
|---|---|---|---|
| 3,088,323 | 5/1963 | Welkowitz et al. | 73/767 |
| 3,137,834 | 6/1964 | Pfann | 73/767 |
| 4,151,502 | 4/1979 | Kurihara et al. | 73/777 |
| 4,185,496 | 1/1980 | Tisone et al. | 73/775 |
| 4,309,687 | 1/1982 | Utner et al. | 338/2 |
| 4,481,497 | 11/1984 | Kurtz et al. | 73/708 |
| 4,605,919 | 8/1986 | Wilner | 338/2 |
| 4,630,491 | 12/1986 | Kitagawa et al. | 73/776 |
| 4,703,663 | 11/1987 | Oppermann | 73/862.68 |
| 4,849,730 | 7/1989 | Izumi et al. | 73/862.044 |
| 4,884,453 | 12/1989 | Hoffmann et al. | 73/776 |
| 4,939,496 | 7/1990 | Destannes | 338/2 |
| 5,001,454 | 3/1991 | Yamadera et al. | 338/2 |
| 5,192,938 | 3/1993 | Ort | 73/776 |
| 5,306,873 | 4/1994 | Suzuki et al. | 338/2 |

*Primary Examiner*—Richard Chilcot
*Assistant Examiner*—Eric S. McCall
*Attorney, Agent, or Firm*—Veo Peoples, Jr.; J. William Stader

[57] ABSTRACT

An electrical type strain gauge for measuring both micro and macro deformations. The gauge may be constructed from thin films of homogeneously conductive polymers, including soluble polyaniline-based conducting polymers and ion-implanted organic polymers. The gauges are characterized by unexpected piezoresistivity from materials having high bulk resistivity, thermal stability, good flexibility, photoimageability and without adding carbon or metal particulate material to the polymer.

5 Claims, 3 Drawing Sheets

HOMOGENEOUSLY CONDUCTIVE POLYMER FILMS AS STRAIN GAUGES

The United States Government has a paid-up license in this invention and the right in limited circumstances to require the patent owner to license others on reasonable terms as provided for by the terms of "Grant Number III-9362010, awarded by the National Science Foundation, and Contract Number DASG60-91-C-0023, awarded by the Ballistic Missile Defense Organization".

FIELD OF THE INVENTION

This invention relates to electrical type strain gauges and in particular relates to improved electrical type strain gauges for measuring micro and macro flexural deformations, and to improved methods for making the same.

BACKGROUND OF THE PRIOR ART

Electrical type strain gauges are based upon the measurement of an inherent electrical property (commonly capacitance or resistance) which is a function of an induced strain. One of the simplest types of strain gauges uses the property of piezoresistivity, or a change in resistance which is proportional to an induced strain (not to be confused with piezoelectricity, which is an induced electrical charge when the material is strained). Piezoresistive films are used to form macroscopic strain gauges (for measurement of many types of structural deformations), or are patterned to small geometries to form micromachined devices which can function as force transducers, such as accelerometers or pressure sensors.

The magnitude of the piezoresistive effect is quantified by a gauge factor (K), which is a proportionality factor between a relative resistance change ($\Delta R/R$) and a strain ($\Delta L/L$) induced in the film by an applied stress.

$$\Delta R/R = K(\Delta L/L). \tag{1}$$

Many commercially available thin-film piezoresistive strain gauges are made of metal foil which has been deposited onto a flexible polymer backing. These strain gauges are adequate for measuring strain in structures such as bridges, buildings, machine parts, etc. However, for certain other applications, such as measuring strains in biological tissues such as ligaments, or for measuring large movements in robotic applications, metal film strain gauges are inadequate because their flexibility is limited by material fatigue. An additional problem with metal film strain gauges is delamination of the gauge from the object to be evaluated.

Low inherent resistivity of metal film strain gauges poses more application problems. In order to achieve a strain gauge resistance which is large enough to measure and distinguish from lead wire resistance, several approaches are used. The metal films are designed to have a large length/width ratio of the metal line itself (as great as 500) to increase the resistance. The metal pattern is folded back upon itself so as to take up as little space as possible, but the size of the overall strain gauge is dictated by the required length/width ratio. Commercial metal film strain gauges have a typical resistance of 50–100 ohms. The contribution of lead wire resistance to the total strain gauge resistance can be appreciable, and introduces errors of several percent. Lead wires have an appreciable temperature coefficient of resistance, which makes compensation for the lead wire resistance difficult. To eliminate the effect of lead wire resistance, a multiple-terminal resistance measurement is recommended by strain gauge manufacturers, but this method of compensation is less desirable because more than two leads must be connected to the device.

For micromachined sensors, silicon is usually the material of choice because of its compatibility with semiconductor processing. The use of silicon limits the choice of substrate, as either single crystal substrates or else a substrate which can tolerate silicon deposition temperatures must be used. Silicon cannot be used for larger-scale applications because of its limited flexibility.

Polymer based strain gauges have been suggested as a more flexible substitute. These gauges, for the most part, have been produced by imparting piezoresistivity to non-conductive, organic polymer insulating phase material. The insulating phase is made conductive by heterogeneously intersticing or imbedding conductive material into the insulating matrix whereby at high enough loading of conductor, contact between grains allows current flow. Presumably, changing the distance between conductive particles by expanding or contracting the film changes the conductivity, resulting in a piezoresistive effect.

United Kingdom patent GB2141548A by Welwyn Electronics Ltd. discloses a transducer incorporating an electrical resistance strain gauge element in the form of a conductive polymer comprising a dispersion of electrically conductive or resistive particles in an electrically insulating organic polymer. The particles comprise a dispersion of electrically conductive carbon in an organic polymer such as epoxy, alkyd, polyester, acrylic or silicon materials or copolymers thereof. It was necessary to provide a primary member, adapted to be deflected, comprising aluminum or aluminum alloy because the heat treatment which was required to impart resistivity to the gauge degraded the elastic properties of certain materials on the strain gauge, making them unsuitable for use by themselves.

Also, in the 1991 proceedings of the ISHM, Rojek, et al., reported a three-component piezoresistive film where tin and graphite particles were required to be intersticed in the organic resin polyesterimide (polimal).

In an article entitled "Polymer Thick-Film Technology: A Possibility to Obtain Very Low Cost Pressure Sensors?," published in *Sensors and Actuators* A, 25–27 (1991), pages 853–857, carbon loaded organic polymer thick-film resistors were used as pressure sensors under limited temperature conditions.

In the 1992 proceedings of the Materials Research Society (April, 1992), Frazier, et al., published a report entitled "Mechanical and Piezoresistance Properties of Graphite-filled Polyimide Thin Films." The piezoresistance coefficient was a function of graphite loading, with good piezoresistive properties exhibited in the loading range of 15% to 25% graphite.

The piezoresistive properties of strain gauges made from such materials have a number of shortcomings. First of all, the particulate nature of the films prevents small geometry patterning. A second problem is delamination of the polymer from the particle surface. This is a common problem with carbon matrix composites for structural applications, and it is commonly attributed to poor wetting and poor adhesion of the filler to the matrix polymer. A similar failure mechanism occurs in carbon-filled polymers which are used for conductive polymer films, especially when they must undergo large and repeated deformations. Therefore, as piezoresistivity increases in the 15% to 25% graphite loading range, the structural integrity of the gauge becomes less stable.

A further disadvantage of filled systems is that it is often difficult to keep uniform dispersions of carbon and metal polymer mixtures. Shelf stability of the carbon-matrix dispersion can be poor due to settling out of the filler particles. If the films are compounded from dry ingredients, it is often difficult to form a uniformly compounded product. Such strain gauges are reported to have non-uniform resistances associated with their heterogeneous nature. (See B. E. Roberston and A. J. Walkden, "Tactile Sensor System for Robotics," in *Robot Sensors*, Vol. 2—*Tactile and Non-Vision*, Alan Pugh, Ed., Springer-Verlag, IFS Ltd., UK, 1986.)

In U.S. Pat. Nos. 4,708,019 and 4,808,336, Rubner disclosed polymeric pressure transducers made from a piezoresistive blend of an iodine doped acetylene polymer in combination with an elastomer. While such strain gauges have a high degree of flexibility, the methods by which they are produced (polymerizing the polyacetylene into a film or elastomer which is deposited on the inside surface of the polymerization flask, or else polymerization into solvent-swollen rubber) cannot be used to coat on various substrates. There remains the disadvantage that such polyacetylene films are highly unstable. In the journal *Molecular Crystals and Liquid Crystals* (1985), Vol. 118, pages 129 through 136, the article "Electrical Conductivity of Modified Polyacetylenes and Polypyrroles" clearly indicated that no stabilizing effect to air could be obtained in iodine doped polyacetylenes, and the conductivity was highly sensitive to oxygen. As discussed in the article entitled "Electrical and Photovoltaic . . . ," the conductivity of iodine-doped polyacetylene falls off rapidly if the polymer is heated. This thermal instability would prevent the lithographic patterning of these films, as solvent-removal bakes are a necessary part of the photoresist patterning process.

For these prior art materials, the magnitude of the gauge factor (K) is approximately 2 for metals, 100–200 for silicon, 2–17 for polymer films with conductive filler, and 1.3–31 for doped acetylene polymer polymerized into a polymer matrix.

The discovery of a homogeneously conductive polymer which could be made piezoresistive without embedding carbon or metal conductive islands and without problems associated therewith, and without sacrificing thermal stability so as to permit submicron photolithographic featuring on strain gauges which are coated onto virtually any substrate, would be a welcome improvement in the art and an unexpected advantage.

The formation of homogeneous, conductive polymer films has been previously demonstrated. These films are composed of polymer chains which are soluble and processable in the conductive state (U.S. Pat. No. 5,262,195), or polymer films which have been made conductive by ion implantation (R. E. Giedd, M. G. Moss, M. M. Craig, and D. E. Robertson, "Temperature Sensitive Ion-Implanted Polymer Films," *Nuclear Instruments and Methods in Physics Research* B59/60, pp. 1253, 1991,) and are not binder-filler mixtures. Strain gauges formed from piezoresistive, homogeneous conductive polymer films would have several advantages over the prior art. The processing advantages of the carbon- or metal-based composites would be maintained (ease of coating on multiple substrates). The need for three- or four-terminal measurements which are necessary in the case of metals would be eliminated because of the polymer's higher resistance. Finally, a conducting polymer film would have greater uniformity because of its homogeneity. The conducting polymers would combine the high performance of silicon films with the processing capability of deposition on a wider variety of substrates.

It is not immediately apparent that a homogeneous, conductive polymer film would have a piezoresistive gauge factor which would be on the order of those of the prior art materials, as the conducting polymer consists of intertwined "wires" of polymer whose diameters are much smaller than the particles in carbon and metal matrix composites. Similarly, neither type of conductive polymer possesses the crystal structure inherent in silicon nor its band gap mechanism of conductivity. Likewise, the conductivity of the conductive polymer is not metal-like, as demonstrated by its resistance-temperature behavior. Nevertheless, we have shown that thin films of conducting polymers have gauge factors which are on the order of the prior art, and these materials can be used as strain gauges with many processing advantages over the state-of-the-art. Surprisingly, the gauge factors change very little with respect to temperature over a broad temperature range, although temperature compensation must be applied to correct for changes in absolute resistance.

It is therefore an object of the present invention to provide an improved polymeric strain gauge from homogeneously conductive polymers having improved bulk resistivity for both macro and micro sized geometric features.

It is a further advantage of the present invention to provide piezoresistive conductive polymers without having to load particulate carbon or metal materials into an insulating matrix.

It is a further object of the present invention to provide improved piezoresistive film gauges which can be patterned by photolithography and yet remain thermally stable.

It is a final principal object of the present invention to provide more flexible strain gauges which can have features as small as the limits of the patterning process detailed into the strain gauge while providing improved performance through improved substrate compatibility.

SUMMARY OF THE INVENTION

The strain gauge of the present invention can be made piezoresistive in an in situ manner, which serves to improve performance and conformity with multiple substrates, and which allows higher bulk resistivity and either macro or microscopic geometric features.

This invention relates to Applicants' discovery that certain thermally stable homogeneously conductive films unexpectedly exhibit effective piezoresistivity, when employed in the measurement of strain, for the measurement of large flexural deformations. These transducers can comprise either one of two alternative types of polymers, i.e., solvent soluble polyaniline conducting polymers, or ion-implanted polymers. The polymers are patternable by photolithography. The processes for imparting piezoresistivity in the ion implanted films also impart an in situ differential solubility between piezoresistive and non-piezoresistive sections.

DETAILED DESCRIPTION OF THE DRAWINGS

FIG. 4 depicts the photolithographic patterning process whereby small features can be formed in the conductive polymer films. The figure is not to scale. Specific layers are numbered as follows: 41, ion implanted polymer layer; 42, substrate; 43, photoresist; 44, separate glass contact mask. The FIGS. 4A–G refer to the following steps.

4A Shows glass substrate with uniform film of conductive polymer.

4B Photoresist is spincoated and baked to remove solvent to produce a film 1 micrometer thick.

4C Shows exposure step with ultraviolet light.

4D Shows exposed and developed photoresist.

4E Photoresist pattern is transferred to conductive polymer layer using reactive ion etching.

4F Photoresist is removed with solvent.

Figure 5:
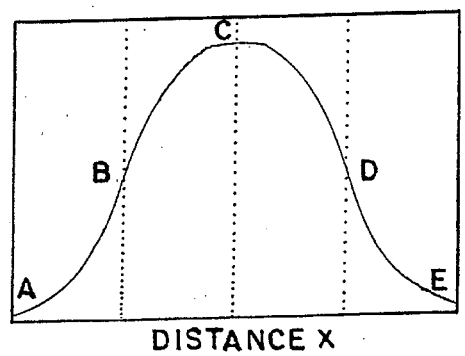

FIG. 5 shows the predicted shape of a flexible film as it is bent longitudinally.

FIG. 6 illustrates the experimental change in resistance ($\Delta R/R$) as a function of the strain, for a polyanisidine p-toluene sulfonate film in expansion and compression.

DETAILED DESCRIPTION AND PREFERRED EMBODIMENTS

The solvent soluble polyaniline conducting polymers used as one raw material of the present invention may be generally described as those disclosed in U.S. Pat. No. 5,262,195. They comprise short alkoxy chain substituted polyanilines doped with large organic counterions. The thickness of such film gauges may range from 500 Angstroms to 1 micrometer, preferably 1000–5000 Angstroms. When employed in the process of this invention, their bulk resistivity of between 1 and 300 ohm cm allows lead resistance to be less than 0.005% of the gauge. If desired, the gauges can be patterned as small as 0.3 microns.

It is particularly preferred, however, to employ ion-implanted polymers in the manufacture of strain gauges of the present invention.

Preferred polymers for implantation are copolymers of styrene with nitrile-containing acrylic polymers such as polyacrylonitrile or polymethacrylonitrile, but depending on the desired properties of the resulting film, other polymers which can be conveyed in an organic solvent or water can be used. These include soluble acrylic polymers, polyethers, polyamides and polyimides and their precursors, polyesters, polyurethanes, polysulfones, polybenzocyclobutanes, phenolformaldehyde resins, or soluble versions of polyaniline or other intrinsically conductive polymers. While the term "polymer" is used throughout, it is understood that oligomers, thermosetting polymer precursors, or other organic compounds which can form a continuous, high-quality film on a substrate, or those materials which can form free-standing films, can be employed.

Some polymers have an absolute resistance which is more stable after implantation, but this quantity is thickness-dependent and is not necessarily transferrable to films which are free-standing as opposed to cast upon a substrate. The choice of polymer is dictated by processing requirements such as solvent required for deposition solvent resistance of unimplanted areas, so as to be compatible with future processing steps or solvents encountered in use.

required mechanical properties of the unimplanted areas (for some applications, a more flexible unimplanted polymer may be desirable).

Implantation is conducted using positive ions (preferably nitrogen, but other ions can be used). The conductivity is a strong function of the fluence, the ion energy, the polymer type, and polymer thickness. Using 50 keV ions, fluences greater than $1\times10^{15}$ ions/cm$^2$ can be used, with the preferred fluence being greater than $1\times10^{16}$ ions/cm$^2$. Beam current density can range from 0.1 microamps/cm$^2$ to 50 microamps/cm$^2$, but it is preferable to keep current density low. Ion energy can range from 25 keV to 20 MeV, with the preferred range from 35–100 keV.

Ion implanted pressure transducers/strain gauges can be manufactured and applied by one of two means. 1) The polymer film can be coated onto the desired substrate, then ion implanted, or 2) a free-standing film of the polymer can be implanted and later attached to the substrate whose strain is to be measured or evaluated.

In Type 1) gauges, it is particularly preferred to employ homopolymers and copolymers containing pendant styrene or nitrile groups. A particular solvent is selected based upon the mode of application of the polymer. If spincoating is the desired method of applying the polymer to the substrate, then the solvent selected to give the most uniform coating quality generally will consist of a solvent/nonsolvent mixture. For example, where the particular solvent has too high a boiling point, it will not evaporate well from the film. Where the boiling point is too low, the solvent will evaporate before the polymer solution is spun to a constant thickness. Preferably, the solvents employed will have boiling points in the range of 125° C. to 225° C., and mixtures of the nonsolvent diluents are employed and/or other solvents in an effort to adjust to the suitable boiling point for a given substrate and a given polymer. Higher boiling points than the preferred range and slightly lower boiling points can also be useful.

The polymer films may be applied to the substrate by a variety of methods including, for example, spincoating, spray coating, brushing, roller coating, or meniscus coating. Solvent is removed by heating or by air drying. For microelectronics applications, the preferred method of coating is spincoating. Spincoating is applicable to flat substrates up to about twelve inches in diameter. The coating thickness which is achievable by spincoating is dependent upon the polymer and the solids content of the polymer in the solvent. It is also dependent upon the speed at which the substrate is spun and to a lesser extent upon the evaporation rate of the solvent.

For ion-implanted films, the preferred thickness prior to implantation will depend upon the type of ion which is implanted, the energy level of the ion implantation, and the polymer density. Computer programs have been developed to calculate the distribution of the ions in the film (J. F. Ziegler, J. P. Biersack, and U. Littmark: *The Stopping and Range of Ions in Solids,* Pergamon Press, Oxford, 1985). Where the polymer film to be implanted is applied to the substrate, the preferred thickness is less than two times the mean range of ions in the film. For example, where an organic polymer is implanted with 50 keV nitrogen ion, the distribution of nitrogen peaks at approximately 1500 Angstroms under the surface. On an insulating substrate such as glass, the optimum film thickness is 1000–3000 Angstroms.

Strain gauges made from such polymer/thickness combinations when ion implanted are particularly resistant to abrasion, moisture, solvent erosion and have improved thermal and ambient stability. Additionally, they have a desirably high electrical resistivity and yet can be micron-sized featured using photolithographic processes.

Where applying the gauge onto an electrically conducting substrate, a layer of an appropriate electrical insulator should be deposited first. Additionally, it should be noted that there is some loss in thickness during implantation, so the final thickness of the film is from 15%–75% of the original thickness, depending upon the polymer and implantation conditions.

Such gauges produced by coating the polymer onto a substrate prior to ion implantation are of particular value in the integrated circuit industry as, for example, in the manufacture of micromachined devices and miniature medical devices, where piezoresistivity can be imparted to the strain gauge without deterring from the ability to design small geometry features into the gauge and while maintaining compatibility with a variety of substrates. Polysilicon deposition requires handling of toxic or flammable gases and substantially higher temperature processes than required for the strain gauges of the present invention.

Where it is desirable to photolithograph the ion-implanted films, photolithographic procedures are employed. A photoresist is spincoated over the ion-implanted film for the particular exposure wavelength. A standard bake processing is imparted to the photoresist. The photoresist is then photoimaged and the resist pattern is transferred to the ion-implanted film by reactive ion etching, as in FIG. 4. If desired, the photoresist can be removed by rinsing in an appropriate solvent such as acetone.

Furthermore, in the case of the ion implanted polymers, the process which imparts the property of piezoresistance to the films offers a novel method of patterning the films. Ion implantation of films of a proper thickness on a substrate at the levels which cause conductivity renders polymer films impervious to solvents and photoresist developer. Thus, the unimplanted portions can be removed by an appropriate solvent, leaving the patterned implanted regions.

Free-standing bridges can be produced through the microlithographic procedure demonstrated in Example 4 and shown in FIG. 1.

Figure 3:
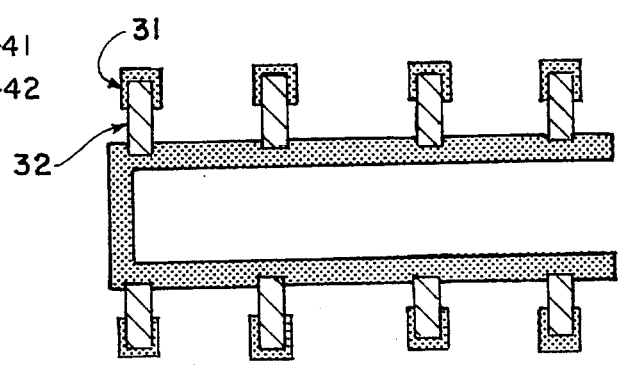
FIG. 3 depicts one embodiment of a sensor array formed from the polymer-based sensors.

An additional preferred embodiment of the present invention includes the production of flexible arrays of a plurality of force transducers, such as miniature pressure or strain sensors. Previously, the resolution of such flexible arrays was limited because either the substance from which the pressure sensor was manufactured was too rigid, or the deposition process required prohibitively high temperatures, or because the material of manufacture of the sensor was too granular in nature to develop micron sized geometry, or because the material of construction of pressure sensors was too low in resistivity. Such an array is shown in FIG. 3.

Figure 1A:
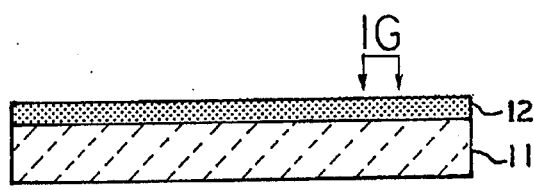
FIGS. 1a–1k depicts processing steps involved in the production of piezoresistive polymer bridge structures.
Figure 1B:
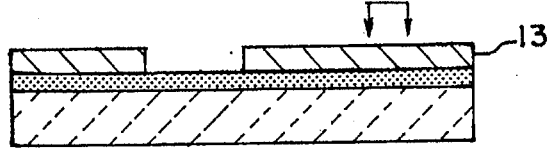
Figure 1C:
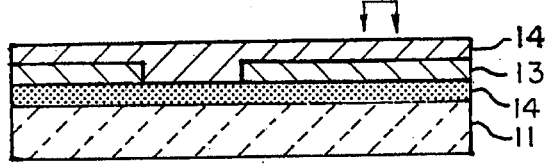
Figure 1D:
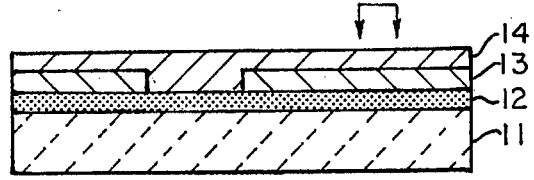
Figure 1E:
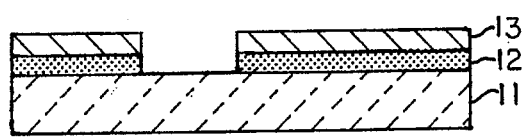
Figure 1F:
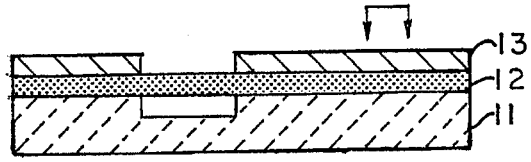
Figure 1G:
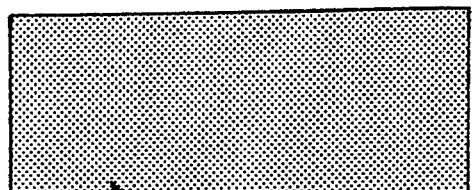
Figure 1H:
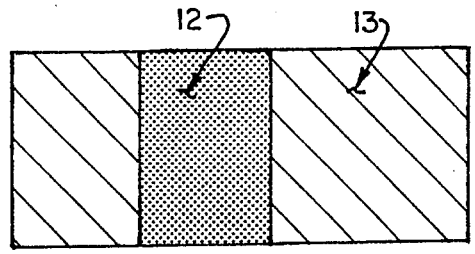
Figure 1I:
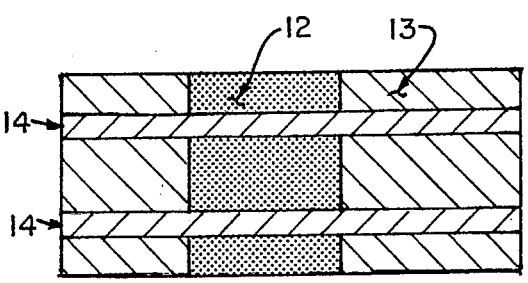
Figure 1J:
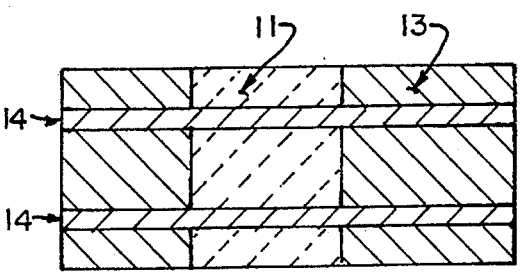
Figure 1K:
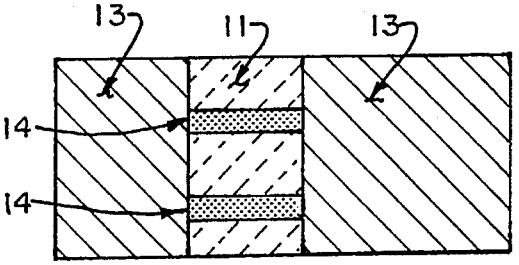
Figure 4A:
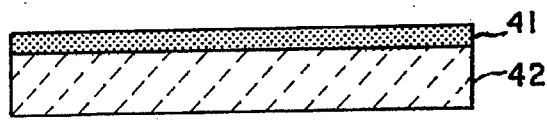
Figure 4B:
Figure 4C:
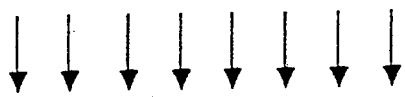
Figure 4C:
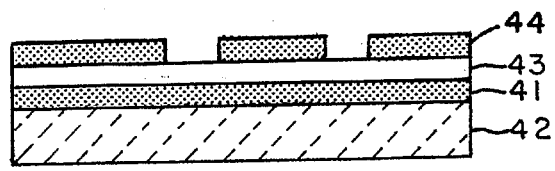
Figure 4D:
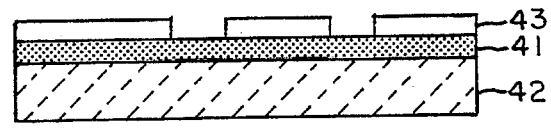
Figure 4E:
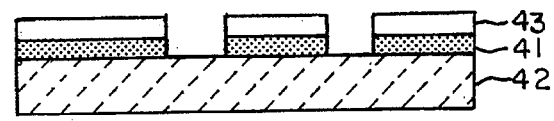
Figure 4F:
Figure 2:
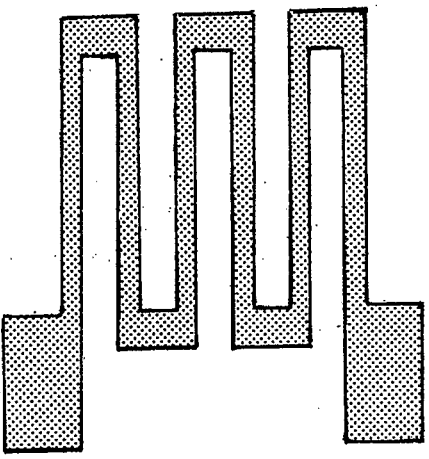
FIG. 2 depicts a typical meander pattern of a metal film strain gauge.

The strain gauges of the present invention are particularly advantageous in small geometry applications because of their homogeneity and high resistivity. Prior art metal foil gauges such as those made from copper have a very low resistivity on the order of $10^{-6}$ ohm centimeters. For the reasons which have been previously discussed, these gauges must consist of a long length/width ratio in order to achieve a measurably high resistivity, and cannot be used to make very small structures. For example, to obtain a metal foil strain gauge with usable resistance of 120 ohm (a standard value), the gauge must be long and narrow and usually designed with a meandering pattern such as shown in FIG. 2. A resistance of 3000 ohm is considered to be very high for a metal foil gauge. However, there are some produced with this resistance. Metal foil gauges range in size as small as 0.02 inches. Although this size is small if measuring strain on a large metal structure, this size is far too large to accommodate high resolution array sensing. The gauges of the present invention have bulk resistivity as high as 50–100 ohm centimeters. The effects of lead resistance may be quantified by the following table:

| Error in gauge factor, based on lead length and strain gauge resistance (Leads are copper wire) | | | |
| --- | --- | --- | --- |
| RG* | Wire length | Wire size | Error in GF |
| 30 Ω | 20 ft | 30 gauge | 13% |
| 120 Ω | 20 ft | 30 gauge | 3% |
| 1000 Ω | 20 ft | 30 gauge | 0.4% |

*(resistance of gauge)

A further detrimental effect of such a low resistance gauge is that lead wire can have an appreciable temperature coefficient of resistance. For these reasons, a three- or four-terminal resistance measurement is recommended by strain gauge manufacturers, but this type of measurement requires extra leads.

Alternatively, ion-implanted polymers to be employed as strain gauges need not be coated onto the substrate. But, rather, free-standing films of the organic polymers can be implanted as in the Type 2) gauges described above. Following implantation, the free-standing film can then be glued or otherwise attached to the substrate whose strain is to be measured. A suitable organic polymer for such purposes is Kapton. Prior art technology for producing strain gauges manufactured from Kapton involved the use of metal foil strain gauges layered on top of Kapton or wire-based strain gauges. Where it is desired to design a strain gauge with a long lead length, ion-implanted strain gauges have a particular advantage over the metal-based strain gauges because the ion-implanted strain gauges have a substantially higher resistivity. Lower resistivity would limit the length of the wire leads which could be employed. Since the continuing section or leads on the gauges of the present invention would represent an integral part of the polymer backing rather than a separate layer, higher reliability can be achieved.

In the process of the present invention, any insulating substrate which can be placed under the high vacuum of an ion implanter may be employed. Type 1) gauges can be deposited on glass, silicon, metal (if insulated), alumina, Mylar, or other flat surfaces. Polyester and polyimide films are both examples of suitable substrates for Type 2) gauges which are quite readily available.

For the purpose of making electrical contact to either Type 1) or Type 2) strain gauges, metal electrodes are applied. If geometries for the electrodes are greater than about 200 micrometers, the electrode attachment may be done by evaporation of metal through a mask and onto the desired points of contact with the film. For smaller geometries, the electrodes must be patterned by a photoresist process.

In Type 1) gauges, when the films are thin enough that entire depth of the film is implanted, then the electrodes may be placed in between the film and the substrate, provided that the substrate which is the subject whose stress is to be evaluated or measured has been made electrically insulating.

The use of the strain gauge should be accompanied by temperature correction of the absolute resistance, for example, by placing the strain gauge in a Wheatstone bridge, the other element of which is in thermal contact with the substrate, but which is unstrained.

Other processing steps can be performed depending upon the type of device being made. For instance, if pressure sensors or accelerometers are made, a membrane of the conducting polymer film would be made, or the conducting polymer film would be placed on top of a compressive substrate. By conducting polymer, we mean that the polymer film is homogeneously conductive in nature and can be either the polyaniline solvent soluble polymers or can be ion-implanted polymers.

EXAMPLE 1

Fabrication of Free-Standing Strain Gauges

A solution of poly(styrene-co-acrylonitrile) is spincoated onto polyester films which are 100 micrometers thick and baked to remove solvent. The resulting film of polystyrene-acrylonitrile on top of the polyester is 1500 angstroms thick. The films are then implanted with 50 keV $^{14}$N+ ions to a fluence of $1\times10^{16}$ ions/cm$^2$. Following implantation, gold is evaporated on top of the film to form electrical leads. Wires are connected to the gold leads by conductive epoxy.

The film is clamped on both ends, and the distance between clamps is decreased in order to flex the film. Thus, one side of the film undergoes compression and one side extension. The resistance is measured continuously while the film is flexed.

The strain $\Delta L/L$, is calculated as follows. The mechanical stress is applied parallel to the film surface through supports at each end. Thus, the longitudinal piezoresistive effect is studied. The film is initially flat with a length, s, and is fixed to rigid clamps at each end. When the distance, x, between the two clamps is reduced, the film starts to bend either up or down as a result of the pliant property of the film. Since the material is uniform and because of the minimum energy requirement, we expect a constant curvature for the bending since no part of the film can "kink" more than any other part of the film. This assumption results in bending as shown in FIG. 5. The whole curve is divided into four parts with the same path length, s/4, and the same radius, r, for each part. The r is related to x through the following equation.

$$\sin(s/4r) - x/4r = 0, \quad (2)$$

where s is the maximum x, or the total length of the film. By solving Eq.(2), the shape of the curve in FIG. 5 is found as a function of x.

We can now calculate the compression and extension of the two surfaces of the film. The radius for the top and bottom surfaces of the film is r+t/2 and r−t/2, respectively, where t is the film thickness. The strain introduced on the top and bottom surface is, $$a = \pm t/2r \quad (3)$$

where + and − denote the extension and compression modes. The quantity, $\Delta x = s - x$, denoting the relative change in distance x where s is 6 cm and t is 100 μm. The quantity, $\Delta x$, can be precisely measured, so a is easily obtained. FIG. 5 shows the predicted shape of a flexible polymer film as bent longitudinally. A and E are the end points; B and D are the inflection points; and C is the central peak.

Figure 6A:
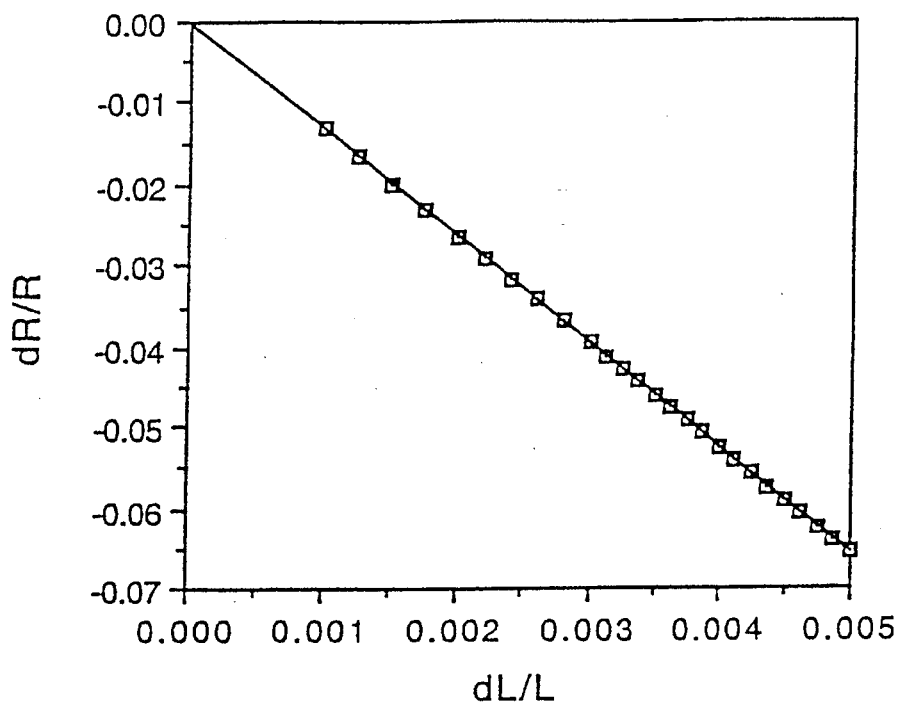
Figure 6B:
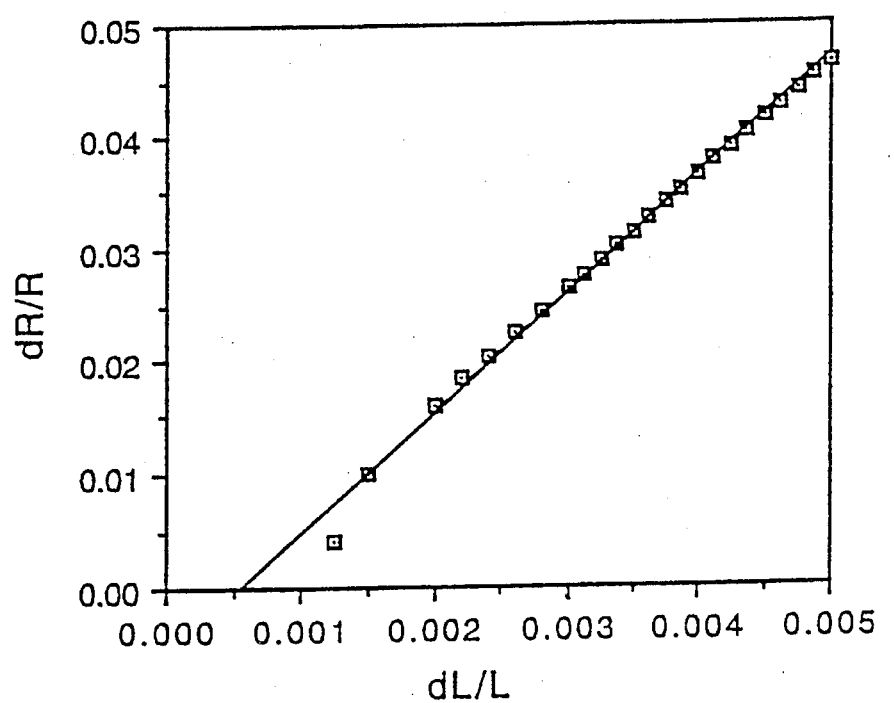

The gauge factor of the film in Example 1 is 12 (tension) and 15 (compression). Typical plots of resistance change versus strain are shown in FIG. 6a (compression) and FIG. 6b (expansion).

If desired, the polymer resistivity is controlled by varying the fluence used in the implantation. The table below illustrates the resistivity of the polymer in Example 1 as a function of fluence when implanted with nitrogen ions.

| Resistivity as a function of Fluence Poly(styrene-co-acrylonitrile), 80/20), 1500 Å, 50 keV N+ | |
|---|---|
| Fluence, ion/cm$^2$ | Rs, Megohm/square |
| $1 \times 10^{15}$ | 6760 |
| $5 \times 10^{15}$ | 771 |
| $1 \times 10^{16}$ | 55 |
| $1 \times 10^{17}$ | 9 |

The lead resistance in the above table was less than 0.003% of the total resistance.

EXAMPLE 2

A free-standing film of polyester is implanted with 50 keV N$^+$ ions to a dose of $1\times10^{16}$ ions/cm$^2$ with a beam current of 200 microamps. The resulting gauge factor (compression) is 32.

EXAMPLE 3

Polyanisidine p-toluene sulfonate (Pani) is dissolved in N,N-dimethylformamide, filtered through 0.2 micrometer filters, and spincoated on top of poly (ethylene terephthalate) films (100 micrometers thick). The gauge factor of the Pani film is equal to 8.

The Pani films were incorporated into an electronic balance. A pan containing the weight to be measured was suspended from a cantilever arm made of the Pani film, and the film resistance was displayed as a value which was a function of the deflection in the film.

EXAMPLE 4

Three-dimensional ion implanted polymer bridges are formed by the following method. Films of poly(styrene-co-acrylonitrile) are spincoated on glass microscope slides to form films 1500 Å thick and implanted as in Example 1. Gold is evaporated on top of the entire slide, then scratched to form lines which are approximately 30 micrometers wide. Positive photoresist is then spincoated on top of the gold. The photoresist is patterned with lines which are 5 micrometers wide and spaced 25 micrometers apart and which are perpendicular to the gold stripes. The ion implanted film exposed in the gold scratch and which is not covered by photoresist or gold is removed by a reactive ion plasma etch step. The slide is then dipped in hydrofluoric acid to etch the glass exposed by the plasma etch step. The glass under the photoresist/implanted polymer lines is etched out completely leaving free standing bridges. The gold is slightly undercut by the etching. Finally, photoresist is removed with acetone and the gold layer can also be removed with etchants. In this way, freestanding conductive polymer bridges are formed.

FIGS. 1A–1K, illustrating Example 4, and the numerals have the following meanings:

(Drawings are not to scale; dimensions are given below.)

11. Glass substrate, 1 mm thick
12. Ion implanted polymer film, 0.1 micrometer thick
13. Gold leads, separated by 30 micrometers
14. Photoresist, 1 micrometer thick, 5 micrometers wide, separated by 25 micrometers

Description of 1A–1K 1A,1G Shows glass substrate coated with uniform film of implanted polymer (side and top views)

1B,1H Gold is evaporated (300–400 Å thick) and removed to form strip of exposed implanted polymer.

1C,1I Photoresist is spincoated, exposed through a mask, and developed to provide narrow photoresist stripes perpendicular to the gold strips.

1D,1J Implanted polymer film has been removed by reactive ion etch in areas where there is not photoresist or gold.

1F,1K Glass is etched with hydrofluoric acid revealing freestanding bridges. Photoresist is removed.

EXAMPLE 5

To assess long-term reliability, a sample prepared as in Example 1 was placed in a helium-cooled chamber at 120K and vibrated at 5 Hz for a 12-hour period, in which the vibrations corresponded to $2 \times 10^5$ deflections with a magnitude of 3.5 mm out of a total length (distance between clamps) of 2.5 cm (14%). (Note that this value is not the value of $\Delta L/L$, but represents the total movement of the film.) Upon remeasurement of the sample's gauge factor, no significant differences were observed.

EXAMPLE 6

To determine the effects of temperature upon the gauge factor, a sample was prepared as in Example 1, but implanted with $5 \times 10^{16}$ ions/cm$^2$. A constant $\Delta L/L$ was applied to the sample, and the resulting $\Delta R/R$ was measured as the temperature was decreased from room temperature down to 150K, with the result that the $\Delta R/R$ at 150K varied by 6% from the gauge factor at 300K.

What is claimed is:

1. A piezoresistive film gauge, for transducing electrical signals from large flexural deformations, said film gauge comprising
   a. thermally stable, homogeneously conductive organic film, said film being selected from the group consisting of
      i. solvent-soluble substituted polyanilines, and
      ii. organic films which have been made semiconductive by ion implantation; and
   b. having electrodes attached to the film, for resistance measurement, without lead resistance being an appreciable part of conductivity;
   whereby flexural deformations can be transduced into electrical signals in homogeneously conductive polymers, thus negating heterogeneous conductive islands intersticed in a thermally unstable insulating polymer matrix.

2. The gauge of claim 1 having photolithographic features patterned into the film.

3. Film gauge of claim 1 arranged as a flexible array of a plurality of force transducers.

4. The film gauge of claim 1 wherein polyaniline is blended in solution with a second polymer.

5. The film gauge of claim 4 wherein the second polymer is polyimide.

* * * * *